Feb. 6, 1945.  S. I. BOUSMAN  2,368,703
SEDIMENTATION APPARATUS
Filed Jan. 29, 1943   4 Sheets-Sheet 1

*INVENTOR.*
SAMUEL I. BOUSMAN
BY
*ATTORNEY*

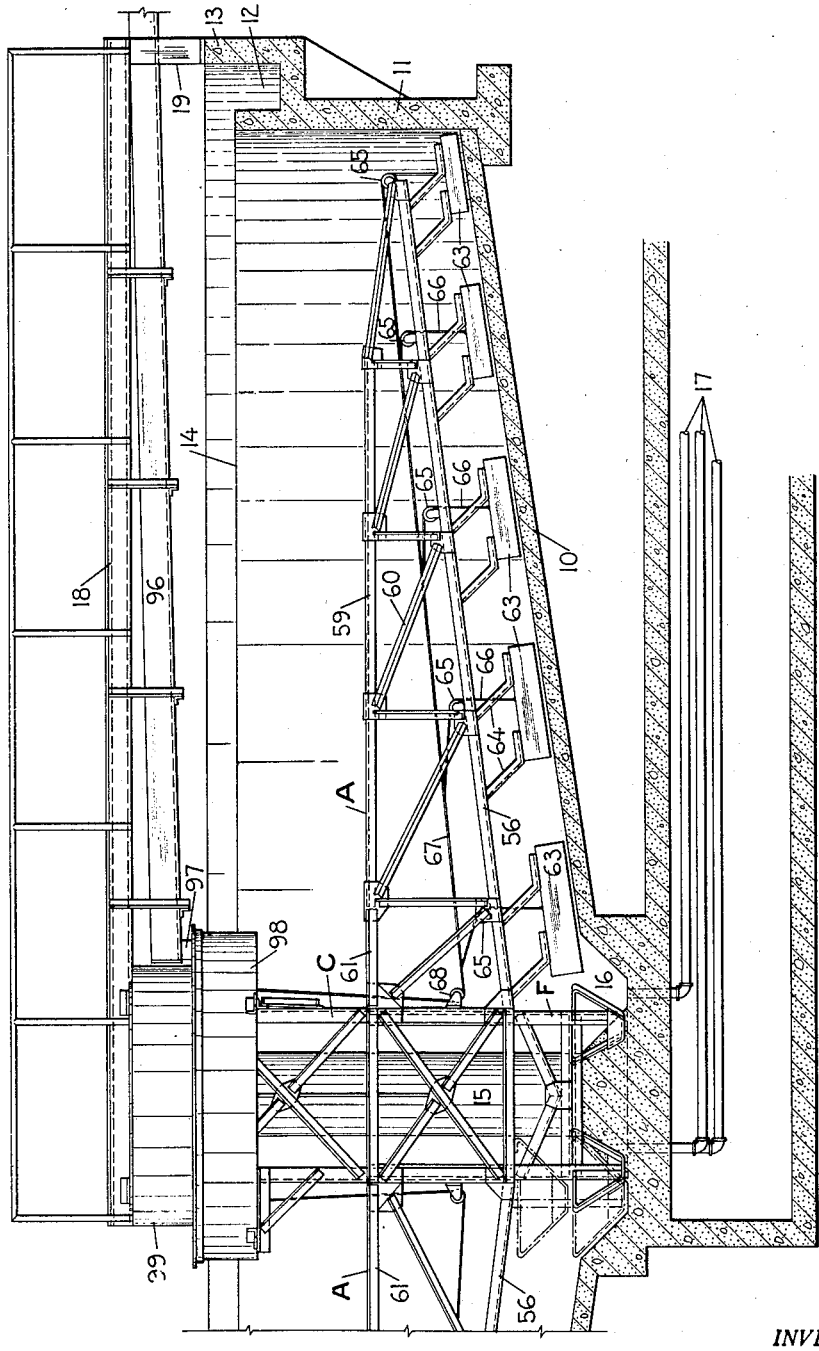

Feb. 6, 1945.　　　S. I. BOUSMAN　　　2,368,703
SEDIMENTATION APPARATUS
Filed Jan. 29, 1943　　　4 Sheets-Sheet 4

INVENTOR.
SAMUEL I. BOUSMAN
BY
Martin E. Anderson
ATTORNEY

Patented Feb. 6, 1945

2,368,703

UNITED STATES PATENT OFFICE 2,368,703

SEDIMENTATION APPARATUS

Samuel I. Bousman, San Francisco, Calif., assignor to Western Machinery Company, San Francisco, Calif., a corporation of Utah Application January 29, 1943, Serial No. 474,025

3 Claims. (Cl. 210—55)

This invention relates to improvements in sedimentation apparatus of the continuously operating type which are also frequently referred to as classifiers or thickeners.

It is the object of this invention to produce an apparatus of the type indicated which shall be provided with means for readily releasing the rotatable assembly so that the machine can be started without first cleaning it.

Another object is to provide a machine of the center drive type in which the center pier is not subjected to any torque strains during the operation.

Another object is to provide a machine having a center discharge cone or groove and independently releasable cone scrapers that can be raised and lowered as required to clean the discharge cone or groove.

A further object is to produce a machine having rake arms provided with scraper blades that can be raised and lowered independently of the cone scrapers so that the discharge cone groove can be cleaned before the scraper blades are lowered into operative position.

A further object of the invention is to provide a machine in which the scraper blades carried by the rake arms shall be connected to the latter in such a way that they will automatically raise when the resistance to rotation increases beyond a predetermined value.

A still further object is to provide an improved rake arm bearing employing tapered rollers instead of balls, and another object is to simplify the construction of this type of machine, to increase its efficiency and to decrease the cost of manufacture and installation.

The above and any other objects that may become apparent as this description proceeds are attained by means of a construction and arrangement of parts that will now be described in detail, and for this purpose reference will be had to the accompanying drawings in which the invention has been illustrated, and in which:

Figure 2 is a view showing a diametrical section of the basin, taken on line 2—2, Figure 1 and showing the arm and walkway truss in side elevation, looking in the direction of arrows 2, Figure 1;

Figure 1:
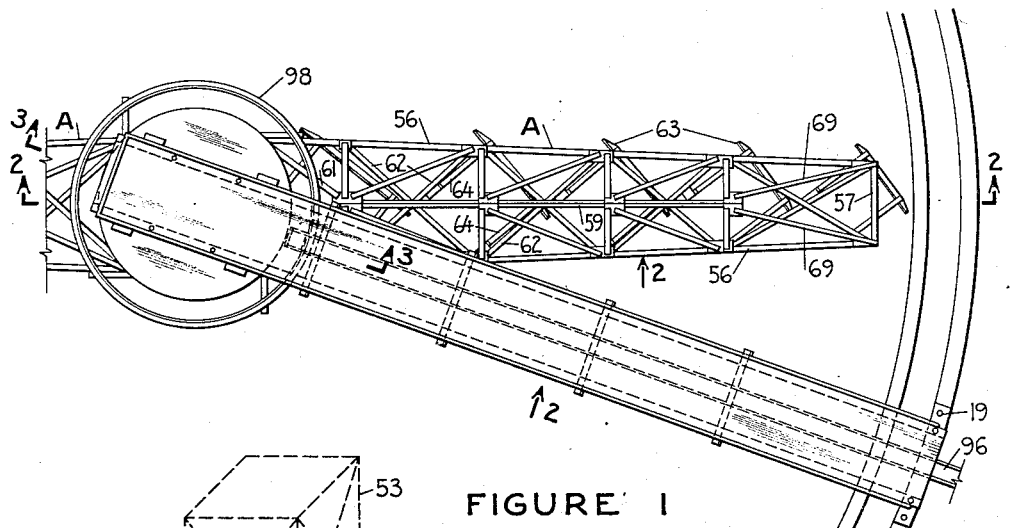
Figure 1 is a fragmentary top plan view of the apparatus.

The sedimentation apparatus to which this invention relates is in many particulars analogous to other apparatus invented for this purpose and consists of a circular basin, usually formed from concrete, and which is provided with a frusto-conical bottom that has been indicated by reference numeral 10. The outer limit of the bottom is determined by the boundary wall 11 which is preferably circular. Surrounding the upper end of wall 11 is a trough 12 that serves to receive the overflow and this trough is bounded on its outer side by a wall 13 of considerable greater height than the inner wall. The top of the inner wall, which has been designated by reference numeral 14, determines the liquid level in the apparatus when it is in operation. Extending vertically from the center of the basin is a concrete pier 15 and this is surrounded at its base by an annular groove 16 which will be referred to as the discharge cone. The bottom of groove 16 is in communication with a number of discharge pipes 17.

A walkway truss 18 has its inner end indirectly supported by the pier 15 and its outer end supported by the wall 13. In the present embodiment a metal supporting structure 19 is secured to the top of wall 13 and to the outer end of the walkway truss but it is evident that any other suitable means for supporting the outer end of the truss may be employed, the principal requirement being that the end of the truss be supported immovably with respect to the basin wall. Surrounding the pier and rotatably supported thereby is a cage that has been designated as an entirety in Figure 2 by C and extending radially from this cage are two rake arms that have been designated by the letter A.

Figure 5:
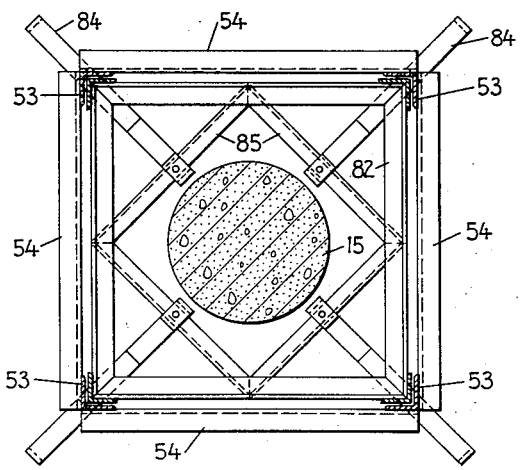
Figure 5 is a section taken on line 5—5, Figure 3.
Figure 3:
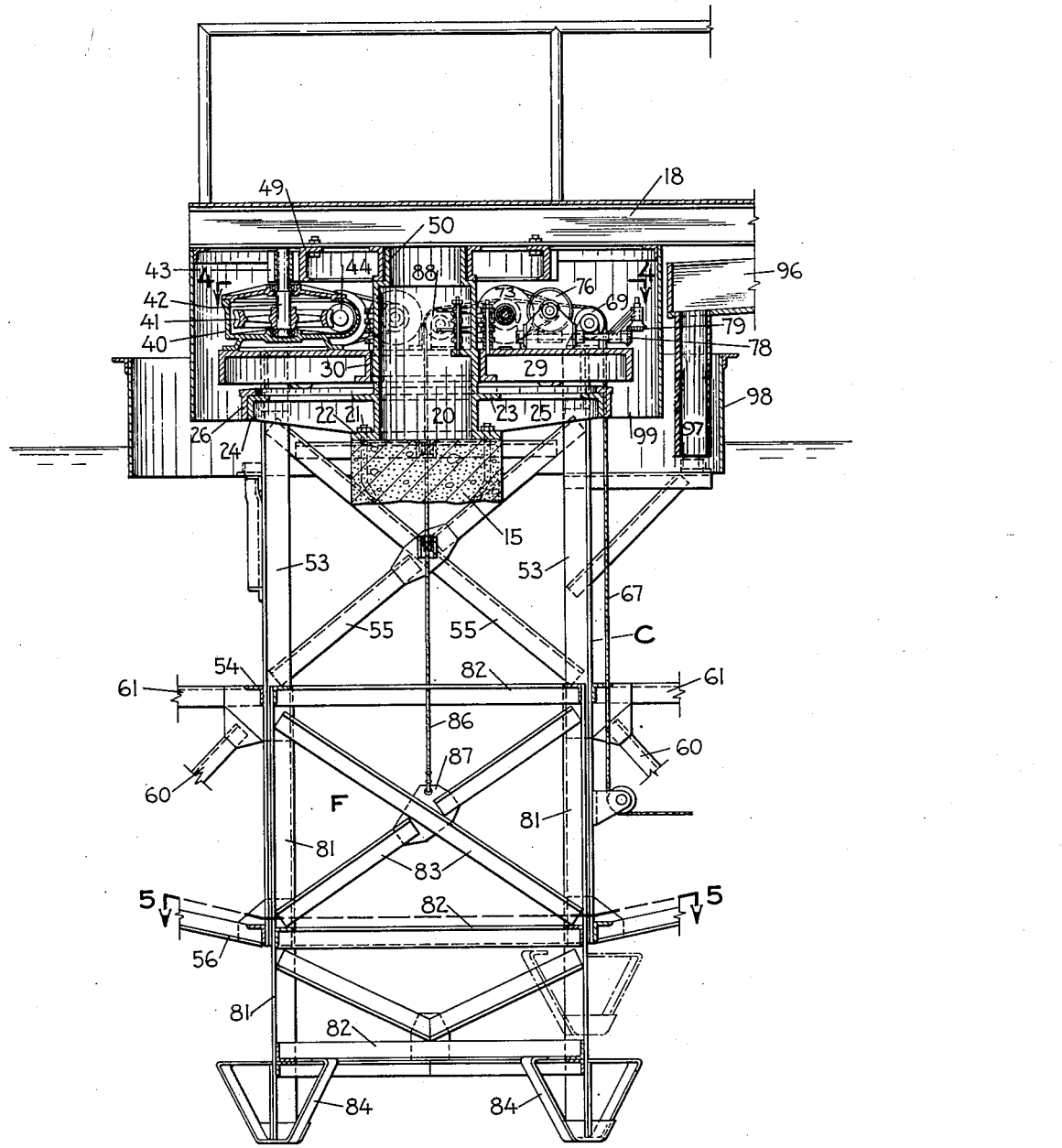
Figure 3 is a section taken on lines 3—3, Figures 1 and 4.
Figures 4, 6:
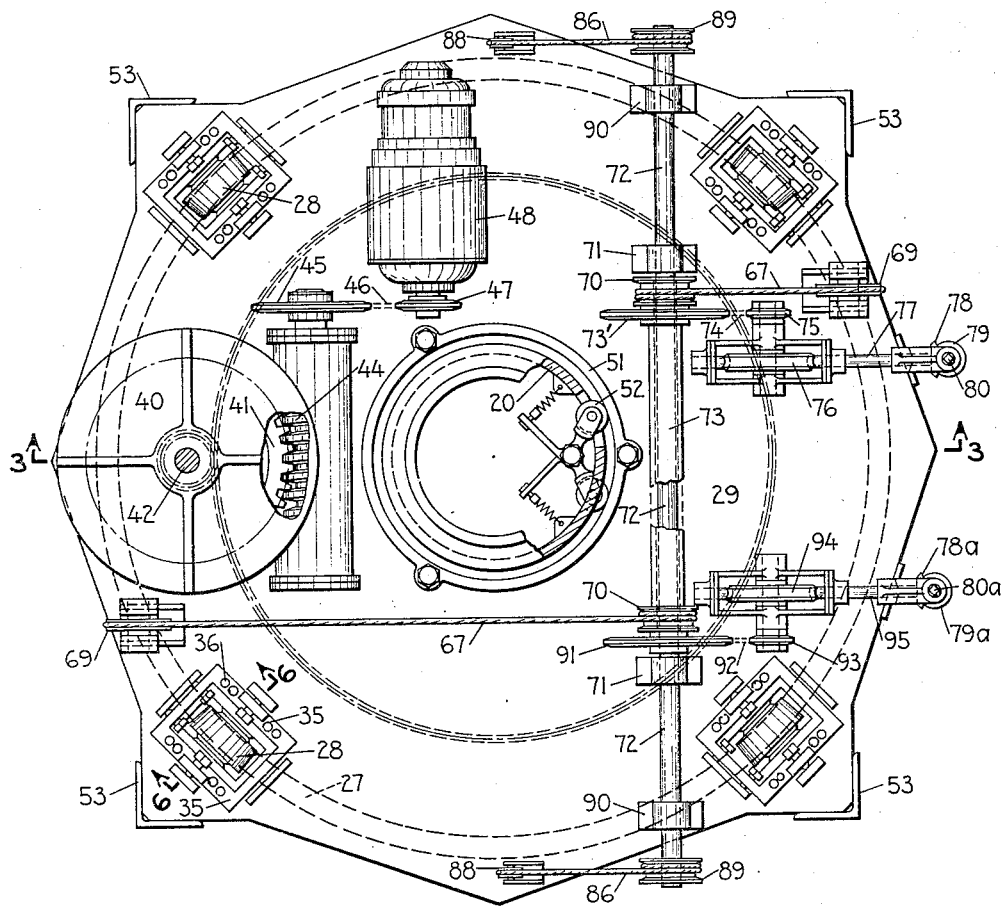
Figure 4 is a plan view of the upper end of the rotating cage, taken on line 4—4, Figure 3.
Figure 6 is a section taken on line 6—6, Figure 4.

Referring now more particularly to Figures 3 and 5 it will be seen that a tubular casting 20 is supported from the upper end of the pier and secured to the latter by bolts 21. This tubular casting is provided with a flange 22 and a short distance above this flange and integral with casting 20, is an annular supporting member 23 that terminates in a downwardly extending flange 24. Extending from the flange to the center cylindrical member are a number of radial ribs 25. A steel track 26 is supported and positioned by the member 23 and flange 24, in the manner shown in Figure 6. The upper surface 27 of the track is outwardly inclined and cooperates with a number of supporting rollers 28 (Fig. 6). A turn table 29, which has been shown in plan in Figure 4, is provided with a center opening bounded by a cylindrical wall 30; rotatably connected with the cylindrical casting 20 and guided thereby. The turn table carries a plurality of rollers 28 that serve to support it on the steel track 27. The rollers are secured to the turn table in a manner shown quite clearly in Figures 4 and 6 from which it will be seen that each roller is rotatably connected with a casting 31 having downwardly projecting sides 32 that receive the pin 33 on which the roller is mounted. Bushings 34 are employed in connection with the roller assembly. Flanges 35 extend outwardly and these are drilled for the reception of bolts 36 that serve to secure the roller assembly to the turn table. Each roller assembly is provided with two upwardly extending lugs 37 that have threaded openings for the adjusting screws 38. The turn table is provided with upwardly extending lugs 39 that serve as abutments for the screws 38. By means of this arrangement the rollers can be accurately positioned with respect to the track, both vertically and radially. The holes through which the bolts 36 extend are preferably slightly larger than the bolts so as to permit radial adjustment.

Secured to the turn table is a gear housing 40 in which is positioned a worm gear 41. This gear is keyed to a shaft 42 that is mounted for rotation in suitable bearings in the top and the bottom of the gear case. Secured to the upper end of the shaft 42 is a spur pinion 43. A worm 44 is operatively connected with the worm gear in the manner shown in Figure 4. Secured to the outer end of the worm shaft is a sprocket wheel 45 that is connected by means of a sprocket chain 46 with a similar sprocket wheel 47 on the shaft of the gear motor 48 which is bolted to the turn table. Whenever gear motor 48 operates it transmits motion through the sprocket chain and worm to the shaft 42 which is thereby caused to rotate.

The walkway truss 18 has its under side resting on the top of the bull gear 49 which in turn rests on the tubular cylinder member 20 in the manner shown in Figure 3. The bull gear 49 has a center opening for the reception of the reduced upper end 50 of the tubular cylindrical member 20. The bull gear serves to hold the inner end of the walkway truss in a predetermined position relative to the tubular member 20. The bull gear and pinion 43 are so related that they will properly mesh and therefore whenever motor 48 operates and rotates shaft 42, together with pinion 43, the turn table with the motor bolted to it will be made to rotate while the bull gear remains stationary. It is apparent that by means of this construction the pier 15 will be relieved of all torque strains. Electric current for the operation of the motor is transmitted to the latter by means of slip rings 51 that are carried by the turn table, which cooperate with contacts 52 carried by the center member 20. The actual wire connections have not been shown as this is a matter that any qualified electrician can provide.

The cage C consists of four angle irons 53 whose upper ends are connected with the turn table, as shown in Figure 4. The angle irons extend downwardly, as shown in Figure 3, and are connected by transverse horizontal members 54 and by diagonal braces 55 so as to form a rigid structure. It will be observed that the horizontal members 54 are positioned on the outside of the angle irons and that this is also true of the braces 55; this construction leaves the inner surfaces of the vertical angles free from obstruction, a consideration of importance as will appear as the description proceeds.

Extending laterally from the cage C are two rake arms A positioned as shown in Figure 1. Although two rake arms have been indicated it is evident that a larger number may be employed if desired and it is also possible to employ a single arm, although such a construction is not advocated. If more than two arms are employed, they are preferably equiangularly spaced.

Figure 7:
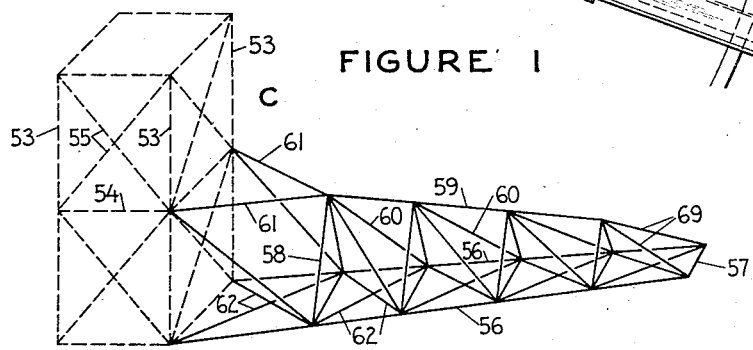
Figure 7 is a diagram showing the arm framing.

Referring now more particularly to Figure 7 which shows a frame diagram, it will be seen that each arm consists of two angle irons 56 whose inner ends are connected with the lower corners of the cage C and whose outer ends are connected by an angle iron 57. At spaced intervals triangular trusses 58 extend upwardly and the upper vertices of these trusses are connected by a tension member 59. Diagonal brace members 60 connect the upper vertices of the trusses with the angle irons 56; tension members 61 connect the upper vertex of the innermost truss with the two vertical angle irons 53 of the cage C. Other cross brace members 62 extend diagonally across the rectangular spaces formed by the lower elements of the trusses 58 and the angle irons 56. Arms constructed in the manner described are rigid and have great strength.

Adjustably secured to the arms are a plurality of scraper blades 63 (Figures 1 and 2) from each of which two arms 64 extends upwardly and forwardly and these are pivotally connected with adjacent braces 62 in a manner indicated in Figure 1. Secured to each rake arm are a plurality of pulleys 65, there being one for each scraper blade 63. A cable 66 is connected with each scraper blade and after passing over the corresponding pulley 65, it connects with a cable 67 that, after passing around the pulley 68, extends upwardly and after passing over the pulley 69 (Figures 3 and 4) is operatively connected with the drum 70 of a winch which will now be described.

The winch consists of two spaced bearings 71 that are secured to the upper surface of the turn table and in which a shaft 72 is rotatably mounted. A tubular shaft 73 is journalled on the shaft 72 and is provided near each end with a drum 70. A sprocket wheel 73' is secured to the tubular shaft near one end thereof and this is connected by means of a sprocket chain 74 with a sprocket wheel 75 attached to the outer end of the shaft to which the worm gear 76 is connected. Associated with the worm gear 76 is a worm that is nonrotatably connected with a shaft 77 whose outer end is provided with a bevel gear 78 that cooperates with a similar bevel gear 79 secured to the lower end of shaft 80. The upper end of shaft 80 has a noncircular cross section so that it may be engaged by suitable socket wrench for rotating it when desired. It will be observed that the tubular shaft 73 has two drums 70 from which cables 67 extend. The two arms are constructed in the same manner as the one that has been described and therefore the winch is so designed that it will simultaneously raise the scraper blades on both arms. If a larger number of arms were employed, a correspondingly larger number of drums and cables would also be required.

Telescopically connected with cage C is a cone scraper frame that has been designated in its entirety, in Figures 2 and 3 by F. This frame consists of four angle irons 81, one at each corner of the rectangular frame. Angle irons 81 are so positioned that they fit into the angles between the flanges of the angle irons 53 and are held in spaced relation by transverse angle irons 82 and by diagonal frame members 83. Each corner angle iron extends downwardly below the cage C and is provided at its lower end with a scraper 84 that is so positioned and shaped as to properly engage the side walls of the cone or groove 16. The lower ends of angle irons 81 are rigidly interconnected by means of the transverse angle irons 82 and further by means of brace members 85, see Figure 5. It will be observed that the construction of the cone scraper frame just described is such that it has great strength and rigidity and that it is telescopically but nonrotatably connected with the cage C.

When the machine is operating, the scrapers 84 are in the position shown in Figure 2 with relation to the discharge cone or groove 16. If, for any reason, the machine is brought to a stop, either as the result of breakage or otherwise, and if it remains standing for a considerable length of time, the solid material held in suspension while the liquid is agitated, will settle towards the bottom and form a heavy layer of sedimentation in the cone groove 16, as well as on the inclined upper surface of the bottom of the basin. When the machine is to be started, it is necessary to lift the blades 63 and also the scrapers 84 to positions above the sediment layer, thereby permitting the cage with its rake arms to be rotated.

In the above parts of the specification the means for lifting the scraper blades 63 has been described and the corresponding means for raising the cone scraper frame will now be described.

Referring now more particularly to Figures 3 and 4, attention is called to the cables 86 that are attached to plates 87. There is one cable for each side of the cone scraper frame, both being attached to the frame in the manner shown in Figure 3. The cables 86 pass upwardly through the turn table and over pulleys 88 and from thence to the winch drums 89 at the outer ends of shaft 72, bearings 90 are provided for shaft 72 adjacent the drums 89. Nonrotatably secured to shaft 72 is a sprocket wheel 91. A sprocket chain 92 connects sprocket wheel 91 with the sprocket wheel 93 on the outer end of the shaft to which the worm gear 94 is attached. A worm carried by shaft 95 is rotatably connected with the worm gear 94. The outer end of shaft 95 carries a bevel gear pinion 78a that is in mesh with a similar pinion 79a nonrotatably secured to the shaft 80a. The shaft 80a has a noncircular end for the reception of a socket wrench by means of which it can be rotated. It will be seen from the above that the mechanism for turning shaft 72 is similar to that employed for turning the hollow shaft 73 and that the two shafts can be independently rotated. Since a worm gear is nonreversible, the parts will remain in adjusted position until the shafts 80 and 80a are rotated.

A feed launder 96 is supported from the walkway truss 18 in the manner shown in Figure 2 and is inclined towards the center. The lower end is provided with a downspout 97, most clearly shown in Figure 3, that directs the material to be treated downwardly into the space between the feed well 98 and splash shield 99, the latter protects the mechanism from any liquid that might otherwise be projected upwardly into contact therewith.

From the above description it will be apparent that the apparatus forming the subject of this invention is so constructed that the cage C with its rake arms can be rotated by means of the gear motor 48 and that the cone scraper frame F, which is slidably but nonrotatably connected with the cage, will also be simultaneously rotated.

When the machine is in operation the material is fed continuously through the launder 96, near the center of the basin, and any solids suspended in the liquid will begin to settle towards the bottom in response to the action of gravity. The liquid near the top will soon be comparatively free from solid matter and will overflow the top of the wall 11 into the overflow trough 12. The solids, when they reach the bottom of the basin, will be engaged by the blades 63 which are arranged in inclined overlapping position with respect to the blades of the adjacent arm or arms, and the action of these scraper blades is to move the solids towards the discharge cone or groove 16. After the solids reach the discharge groove they are permitted to pass outwardly through the pipes 17. The cone scrapers 84 prevent these solids from solidifying in the groove 16 and in this way the machine is capable of continuous operation for any length of time.

If, due to breakage or any other cause, the rotation of the arms is stopped for any considerable length of time, the solids in suspension will continue to settle and will soon form a rather compact layer of solid material on the upper surface of the bottom and also in the groove 16. Unless some means were provided for releasing the arms and the cage to which they are attached, it would be difficult, if not impossible, to start the parts rotating again and therefore after such stoppage the operator employs a suitable socket wrench device, for example, a shaft having a socket at one end and a handwheel at the other, rotates first the shaft 80 thereby raising the blades 63 to such a height as to release them from the deposited solids and after the blades have been raised he transfers his wrench to shaft 80a and rotates the latter in such a way as to raise the cone scraper frame sufficiently to remove the scraper blades 84 from the solids deposited in groove 16. The machine is now started and, after rotation has commenced, scraper blades 84 are gradually lowered so as to agitate the contents of groove 16 and permit the solids to flow out through the pipe 17. After the discharge groove has been cleaned, blades 63 are gradually lowered into the solids resting on the upper surface of the basin and agitates them to put them into suspension in the liquid, whereupon the machine will be in position to function normally.

Particular attention is called to the fact that the cage carrying the rake arms has telescopically connected therewith a scraper blade frame that can be raised and lowered at will and independently of the scraper blades 63. This independent operation of the cone scraper blades and the scraper blades on the arms greatly simplifies the operation of starting the machine and relieves the latter of strong forces that would otherwise be required.

Particular attention is also directed to the means provided for rotating the cage with its attached rake arms. This means is so constructed that it does not subject the pier 15, or the cylindrical hollow member 20, to any torque strains during the operation. The torque developed tends to turn the walkway truss about its pivotal connection with member 20 but exerts no torque on the latter for the reason that the two are rotatably interconnected. The torque developed during the operation and exerted on the walkway truss is resisted by the support connected with the wall 13 or with the ground adjacent the basin. The tubular member 20 serves as a fulcrum about which the walkway truss would turn in case it were free to do so.

In the embodiment illustrated the bull gear 49 and the pinion 43 have been shown as of the spur gear type and this is believed to be the most desirable arrangement. It is to be understood, however, that the spur gear drive may be replaced, if desired, by some other gear reduction mechanism such as a bevel gear or even a worm gear drive.

In the above specification and on the drawings the bull gear and the pinion have been shown as part of the means for effecting rotation of the cage C, the frame F and other associated members. Although a positive drive like that shown is believed to be the best for the purpose, it is evident that the gear and pinion may be replaced on a sprocket chain or by a plurality of V-belts, should such motion transmission means be found to be desirable. Since belts and chains are the mechanical equivalents of gears and pinions, it is to be understood that applicant does not desire to be limited to this specific motion transmitting device and that his claims are intended to cover any suitable mechanical equivalents. In addition to a gear like that shown, it is, of course, possible to substitute a worm gear drive, instead of a spur gear drive, as shown.

Having described the invention what is claimed as new is:

1. In a sedimentation apparatus comprising a basin having a central pier, means for introducing a fluid mixture adjacent the pier, a clarified effluent overflow at the outer edge of the basin and a sediment discharge in the bottom, near the pier, a cage supported on the pier for rotation thereabout, at least two arms extending from the cage, scraper blades on the arms, a walkway truss having one end supported by the pier and the other end nonmovably connected with the wall, a bull gear secured to the under side of the walkway truss, a motor carried by the cage, the motor being positioned underneath the truss, a shaft carried by the cage and mounted for rotation, a pinion carried by the shaft and positioned for cooperative engagement with the bull gear, and means for rotating the pinion by power derived from the motor, whereby the cage and arms will be rotated relative to the pier and the walkway truss.

2. A sedimentation apparatus comprising in combination, a basin provided with a central pier, means for introducing a fluid mixture adjacent the pier, a clarified effluent overflow at the outer edge of the basin and a sediment discharge in the bottom near the pier, a cage surrounding the upper portion of the pier, supported on the upper end thereof and mounted for rotation thereabout, at least two arms extending radially from the cage, a plurality of scraper blades carried by each arm, a walkway truss extending from the pier to the outside of the basin, a bull gear secured to the underside of the truss in concentric relation to the pier, a shaft rotatably mounted on the cage, a pinion carried by the shaft for engagement with the bull gear, a motor carried by the cage, and means for transmitting power from the motor to the pinion to rotate the latter, whereby the cage and arms will be turned about the pier.

3. A sedimentation apparatus having a tank with a sludge discharge in the bottom near the center, sludge discharging rakes; means for feeding a fluid mixture adjacent the center of the tank and a clarified effluent discharge around the outside of the tank, a pier extending upwardly from the center of the tank, a tubular casting supported from the upper end of the pier, a circular flange extending outwardly from the casting adjacent its lower end, a circular track on the flange, a turntable having a central opening for the reception of the casting, means for supporting the turntable from the track comprising a plurality of rollers, a walkway truss having one end supported on the casting, a bull gear secured to the underside of the walkway truss in concentric position with the upper end of the casting, a shaft rotatably connected with the turntable, a pinion on the shaft positioned for operative engagement with the bull gear, a motor operatively connected with the shaft, and a cage suspended from the turntable, the sludge discharge rakes being carried by the cage.

SAMUEL I. BOUSMAN.